United States Patent

[11] 3,600,071

[72] Inventor Rogers B. Downey
Lexington, Mass.
[21] Appl. No. 813,427
[22] Filed Apr. 4, 1969
[45] Patented Aug. 17, 1971
[73] Assignee Polaroid Corporation
Cambridge, Mass.

[54] COMPACT MOTION PICTURE FILM HANDLING CASSETTE AND CAMERA
11 Claims, 5 Drawing Figs.

[52] U.S. Cl. .................................................... 352/78,
242/199, 352/130
[51] Int. Cl. ...................................................... G03b23/04,
G03c 5/28
[50] Field of Search .......................................... 352/72-
—78, 130, 166, 174, 176; 242/197, 199, 200, 76;
95/90.5

[56] References Cited
UNITED STATES PATENTS
3,239,301 3/1966 Denk et al. .................... 352/72
3,282,523 11/1966 Murdoch ....................... 242/200 X
3,383,998 5/1968 Takats ........................... 95/90.5
3,434,783 3/1969 Sakaki et al. ................... 352/72
3,469,906 9/1969 Winkler et al. ................ 352/72

Primary Examiner—Louis R. Prince
Assistant Examiner—Joseph W. Roskos
Attorneys—Brown and Mikulka, William D. Roberson and Robert L. Berger ABSTRACT: A compact multipurpose motion picture film handling cassette useful during exposure, processing and projection operations. An exposure station is located adjacent a corner of the cassette. This arrangement permits the cassette to be mounted in the handle section of a uniquely compact camera and, then subsequently, in a uniquely compact processor-projector unit. The cassette may also include a normally inoperative film processing station. A resilient member of the cassette extends in spaced relationship to idlers intermediate of the exposure station and the cassette's takeup reel and the cassette includes means to receive a force applying member into operative relationship with this resilient member. This resilient member automatically snubs the adjacent idlers when mounted in the camera and is adapted to selectively snub these same idlers when the cassette is in the processor-projector unit.

INVENTOR.
ROGERS B. DOWNEY
BY Brown and Mikulka
and
Robert L. Berger
ATTORNEYS

FIG. 1

COMPACT MOTION PICTURE FILM HANDLING CASSETTE AND CAMERA

BACKGROUND OF THE INVENTION

1. Field of the Invention

This invention relates to motion picture photography and, more particularly, to am improved compact system employing a multipurpose film handling cassette.

2. Description of the Prior Art

After motion picture film has been exposed in a camera, it has generally been the practice for the photographer to mail the reel of exposed film to a processing laboratory. At the laboratory the film is removed from the reel and subjected to a series of operations in order to develop visible images from the images recorded on the exposed film. The fully developed film is then rewound onto a reel at the laboratory and returned to the user.

The extended delay normally incurred between the time exposed film is mailed to the laboratory and returned ready for viewing has proved to be a significant inconvenience to the user and a source of great annoyance.

The field of still photography is no longer hampered by extensive periods of delay associated with the processing of exposed film. The impact on the public of the one-step photographic process employing diffusion transfer techniques is a matter of record and generally well known. The home still photographer can now enjoy the fruits of his efforts in a matter of seconds. This important convenience has been available to the amateur still photographer for many years.

Most recently, important technological advances have made it possible for the home photographer interested in motion pictures to enjoy this same convenience. Radically different motion picture systems have now been developed which permit the photographer himself to quickly and easily process and project a strip of motion picture film shortly after the pictures have been taken. Exemplary of such new and unique systems are those described in copending applications Ser. No. 755,901 of Edwin H. Land filed Aug. 28, 1968; Ser. No. 761,771 of Rogers B. Downey filed Sept. 23, 1968; Ser. No. 776,481 of Rogers B. Downey filed Nov. 18, 1968; Ser. No. 772,789 of Vaito K. Eloranta and Benjamin C. Ruggles filed Nov. 1, 1968; and Ser. No. 788,897 of Rogers B. Downey filed Jan. 3, 1969; all of which applications are assigned to the assignee of the present invention. All of the systems described in the aforementioned copending applications most advantageously employ a cassette from which the film need not be removed during exposure, processing and projection operations.

In commercial and industrial operations such rapid motion picture systems are not only an improvement as a matter of convenience, but have other important effects as well. For instance, motion picture newsreel programs can now be presented on television to the viewing public shortly after events of interest have occurred and been photographed.

Considerable funds and effort are currently being expended to further improve and refine various features of these systems in order to reduce their cost, to further simplify the task of the operator, to improve their reliability and to improve the quality of the final product. One of the major problems encountered in this art is the requirement to package a multiplicity of functions and capabilities into an extremely compact and relatively inexpensive cassette structure. Additionally, the compact cassette structure must be adapted for convenient handling by the operator. Another extremely important consideration is that the camera adapted to receive the compact cassette must itself be a compact relatively inexpensive unit which is both easy to operate and of a configuration pleasing to the eye. These same requirements, i.e., capable of easy operation, an attractive configuration, relatively inexpensive to manufacture and extreme compactness, are also placed upon the processor and projector unit.

In short, to realize the greatest commercial success with motion picture systems employing compact multipurpose film handling cassettes, it is necessary that each unit comprising the complete system be devised to function in cooperation with each of the other units of that system to produce optimized results with respect to a plurality of requirements.

One of the objects of this invention, therefore, is to provide an improved compact multipurpose film handling cassette which is adapted to be mounted in a uniquely compact camera for exposure operations.

Another primary object of this invention is to provide an improved compact multipurpose film handling cassette which is adapted to be mounted in an unusually compact projector for projection operations.

A further object of this invention is to provide a compact multipurpose film handling cassette which is adapted to be both mounted in a compact camera and in a compact processor-projector unit.

An additional object of this invention is to provide a compact multipurpose cassette incorporating improved means for effectively snubbing film guiding idlers thereof when the cassette is mounted in both a camera and a projector.

Still another object of this invention is to provide an improved compact camera uniquely configured to receive multipurpose film handling cassettes.

Also, an object of this invention is to provide a compact camera adapted to receive multipurpose film handling cassettes and having improved means for automatically snubbing idlers of such cassettes.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

SUMMARY OF THE INVENTION

The preferred embodiment of this invention illustrated in the drawings briefly comprises a compact cassette including coplanarly oriented supply and takeup reels adapted to be driven by externally mounted drive means. A strip of unexposed photographic material is initially substantially entirely coiled around the supply reel and has a leader which extends around a plurality of idlers in reaching the takeup reel. Two of these idlers are positioned in opposite extremities of the cassette housing on the same side of the reels. An exposure and projection station is positioned within the cassette housing intermediate of the aforesaid two idlers and in the immediate vicinity of one of those idlers adjacent the corner which it occupies of the cassette housing. This embodiment of the invention also includes an applicator positioned in operative relationship to the film strip as it passes between the two reels of the cassette and which is connected to a rupturable pod containing processing fluid. The cassette housing comprises a removable cover plate which permits an externally mounted pressure applying member to be received into operative relationship with the rupturable pod whereby the pod may be ruptured and the processing fluid initially stored therein to be introduced into a reservoir chamber of a dispensing container in communication with the applicator which also forms part of the dispensing container.

Extending from its housing, the cassette includes a resilient member having portions thereof disposed in spaced relationship to the end surfaces of those idlers intermediate of the exposure and projection station and the takeup reel. The cassette also has means for receiving a force applying member into operative relationship with this resilient member in order that it may be selectively depressed into engagement with the adjacent idlers to effect a snubbing of those idlers.

This compact cassette is adapted to be mounted into the main section of a unique compact camera, which section of the camera is only slightly larger than the cassette itself and a portion of which serves as a handle to be gripped by the operator to facilitate exposure operations. The camera's lens system is automatically aligned with the exposure station of the cassette once the cassette has been mounted in the camera. Also, drive means of the camera automatically engage the takeup reel of the cassette at this time and, further at this time, a pin mounted on the door of the camera automatically depresses the resilient member of the cassette to snub the idlers adjacent thereto.

After the exposure operations have been completed with the cassette mounted in the camera, it may be withdrawn therefrom, its aforesaid cover plate removed, and then mounted in a special processor-projector unit. Force applying means of this unit contact the cassette's pod to effect a rupture thereof and the introduction of the processing fluid initially contained therein into the dispensing container. Additionally, drive shafts of the projector engage both reels of the cassette at this time. The processor-projector unit includes means for engaging the cassette's resilient member and which are selectively operable to effect a snubbing of those idlers adjacent that member of the cassette. Most importantly, since the projection station of the cassette is positioned in close proximity to one of its extremities, the processor-projector unit is significantly smaller in size than would otherwise be possible.

The film strip is processed during an initial rewind onto the supply reel and projection of the then visible images thereon occurs during subsequent returns of the film strip to the takeup reel.

DESCRIPTION OF THE PREFERRED EMBODIMENT

A preferred embodiment of this invention is illustrated as applying a compatible processing fluid to a film structure which comprises both a photosensitive image recording layer and an image-receiving layer in which a visible image may be formed by image-forming substances transferred by diffusion from the photosensitive layer without necessitating the subsequent removal of the processed photosensitive layer. This highly desirable type of film structure is made possible by a developed negative image having low covering power.

In typical silver halide diffusion transfer-reversal processes for the production of black-and-white images, a silver halide developer and a silver halide solvent are applied in an aqueous alkaline solution to a photoexposed silver halide stratum or emulsion where they develop exposed silver halide to silver and react with unreduced silver halide to form a soluble silver complex. This complex, in order to form a positive print, is transferred and reduced to silver on a silver-receptive stratum upon which the silver halide stratum has been superposed. It has generally been the practice, in the completion of this process, to separate the silver-receptive and silver halide strata in order to render the positive image visible, particularly, when it is to be viewed in transmitted light.

However, as indicated above, the positive print may be rendered visible without separation of the silver halide and silver receptive strata. For example, the silver receptive stratum may be so constituted as to provide an unusually vigorous silver precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive images in superposition provide a composite that presents a good image for projection purposes as long as the images are carried on a light-transmitting support. Since the silver halide stratum and the sliver receptive stratum need not be separated, a simplification of the overall silver halide diffusion transfer-reversal process is achieved.

A composite film assembly of this type as well as processing compositions for producing a stable black-and-white image which can be viewed by transmitted light without the necessity of removing the processed, negative image-containing photosensitive layer are shown in prior U.S. Pat. No. 2,861,885 of Edwin H. Land which issued on Nov. 25, 1958. Other composite film assemblies capable of producing photographic records which can be exhibited in full color without the necessity of removing the processed photosensitive layer are shown in prior U.S. Pat. Nos. 2,726,154 To Edwin H. Land issued Dec. 6, 1955 and 2,944,894 issued July 12, 1960. All of these prior patents are assigned to the assignee of the present invention.

However, it should be noted that the present invention is not directed to the chemistry by which visible images are formed in an exposed photosensitive material and/or formed in an image receiving stratum associated therewith. While an illustrated preferred embodiment of the invention is shown applying a compatible processing fluid to a film structure not requiring the removal of the photosensitive layer after visible image formation is completed, the invention itself is also applicable for use with other types of processing fluids and film structures. In fact, in its broadest connotation, the present invention is not limited to motion picture systems employing film handling cassettes having a film processing capability.

Figure 1:
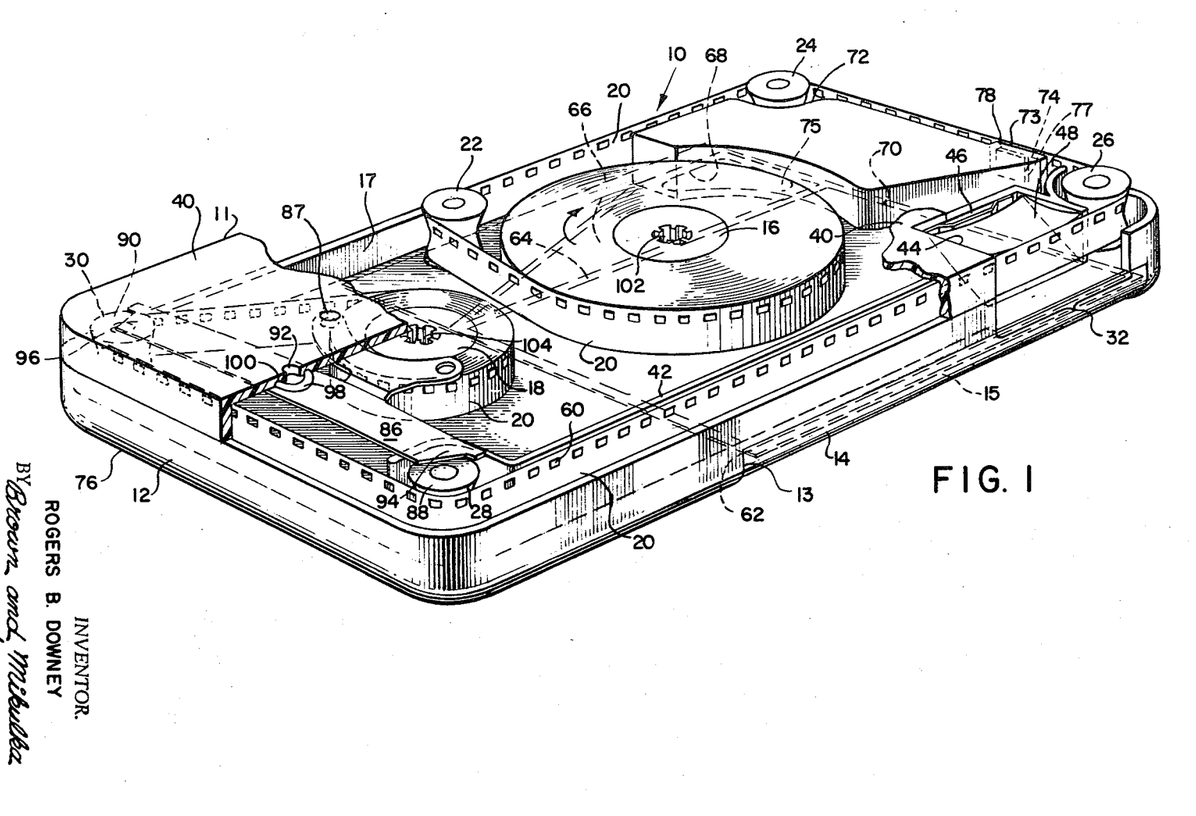
FIG. 1 is a diagrammatic cutaway perspective view of a compact multipurpose motion picture film handling cassette embodying features of this invention.

The illustrated preferred embodiment of this invention may best be understood by first referring to FIG. 1 of the drawings. As may be seen therein, a compact multipurpose film handling cassette 10 is basically constituted by a pair of frame members 11 and 12 connected together to form an enclosed opaque housing. The frame member 12 is provided with a recessed portion 13 and a removable cover plate 14 which in combination define an enclosed section 15 separated from a light tight section 17 of the cassette 10.

Cut out portions of the frame members 11 and 12 define a film gate 32 through which image carrying light rays may enter and/or leave the cassette. In this embodiment, the cassette is relatively flat and generally rectangular parallelepiped in configuration. A supply reel 16 and takeup reel 18 are coplanarly mounted within section 17 of the cassette 10 for rotation about parallel axes. A strip of unexposed photographic material 20, of the type previously discussed, provided with leaders affixed to the supply reel 16 and the takeup reel 18 is initially substantially entirely coiled around the supply reel. In traveling from the supply reel 16 to the takeup reel 18, the strip of photographic material 20 sequentially passes around idlers 22, 24, 26, 28 and 30. In this respect, it is important to note that the idlers 26 and 28 are positioned in opposite corners or extremities of the cassette 10 on the same side of the supply reel 16 and the takeup reel 18. Mounted between the frame member 12 and the wall 40 of the frame member 11 is a light sealing plate 42 which extends adjacent the film strip 20 from a position in the vicinity of the idler 26 to within the vicinity of the idler 28. This light sealing plate 42 is configured to seat along the edge of an opening 44 provided in the wall 40 adjacent the film gate 32 thereby cooperating with the frame member 12 to define a recess 46 within the cassette 10 sealed in a lighttight manner from that portion of the section 17 of the cassette in which the reels 16 and 18 are contained. As will subsequently be explained in more detail, this recess 46 in conjunction with the film gate 32 is adapted to serve as both an exposure and projection station of the cassette 10 and, importantly, is positioned intermediate of the idlers 26 and 28 in the immediate vicinity of idler 26 adjacent the extremity of the cassette 10 which that idler occupies.

Figure 2:
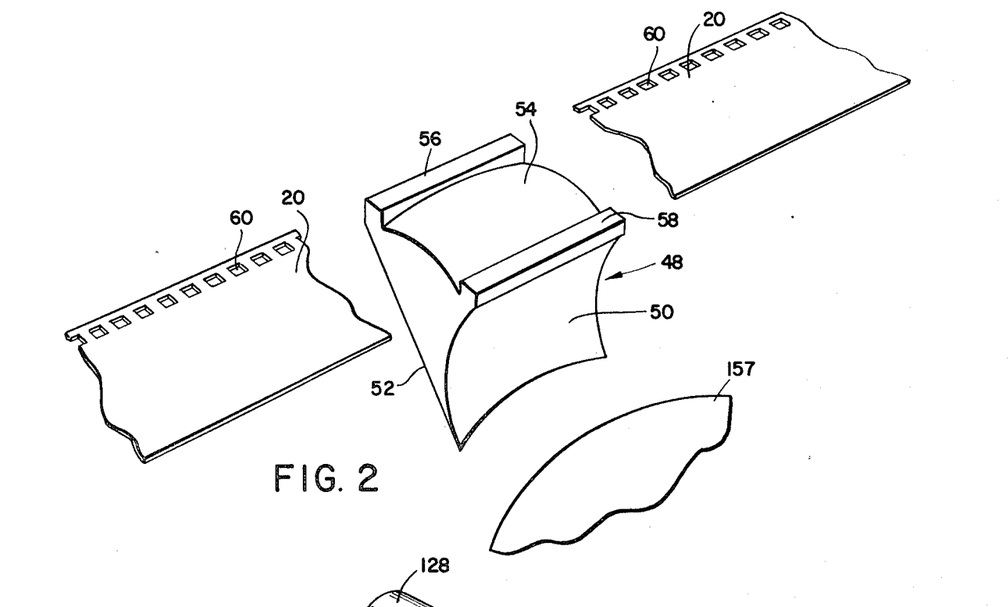
FIG. 2 is a diagrammatic perspective view, partially cutaway, illustrating the light reflecting element and film strip employed in the cassette shown in FIG. 1 and also illustrating the operative relationship between the light reflecting element and the light source of a projector.

Mounted by any suitable means within the recess 46 is a light reflecting element 48. In the system illustrated in the drawings, this light reflecting element 48 is prismatic in nature, as may be seen in FIG. 2, and includes a concave light receiving transparent face 50 and a flat reflecting surface 52 which reflects light received into the element through the concave face 50 outwardly through a convex transparent face 54 onto that portion of the film strip 20 disposed across the film gate 32. This light reflecting element 48 also includes a pair of parallel bearing surfaces 56 and 58 disposed on the opposite sides of its convex transparent face 54 and on which the film strip 20 is supported as it traverses the film gate 32. A prismatic element of this type suitable for use in connection with the present invention is described in copending application Ser. No. 767,609 of Herbert A. Bing filed Oct. 15, 1968 and assigned to the assignee of the present invention. As may be seen in both FIGS. 1 and 2 of the drawings, the film strip 20 includes sprocket holes 60 as is conventional.

Returning now to FIG. 1, a rupturable pod 62 is positioned in the section 15 of the cassette 10 adjacent the frame member 12. This pod 62 includes a weakened seal 64 connected to a fluid feeding device 66 provided with an exit orifice 68. This orifice 68 in turn communicates through an opening 75 in the frame member 12 with a fluid reservoir chamber 70 of a dispensing container 72. This dispensing container 72 also includes an applicator 73 having a doctor blade 74, an orifice 77 communicating with the reservoir chamber 70 and a U-shaped extension 78 adapted to position the strip of photographic material 20 a carefully predetermined distance from the doctor blade. The rupturable pod 62 initially contains processing fluid suitable to develop visible images from images recorded on the film strip 20 during exposure operations. This particular type of processing system is the subject of the present inventor's copending application Ser. No. 813,469 entitled "System for Processing a Strip of Photographic Material" by Rogers B. Downey filed Apr. 4, 1969 which is also assigned to the assignee of the present application. It should be noted that in the preferred embodiment of the capacity of the reservoir chamber 70 of the dispensing container 72 is equivalent to or greater than that of the rupturable pod 62.

It will be appreciated that once the plate 14 has been removed from the frame member 12 an exteriorly mounted force applying member may be drawn across the length of the pod 62 towards its weakened seal 64 and across the fluid feeding device 66 to initially rupture that seal and to cause the fluid to be expelled from the pod through the fluid feeding device into the reservoir chamber 70 of the dispensing container 72. Also, as may be seen in FIG. 3, a support plate 80 is spring mounted from the frame member 11 on the opposite side of the film strip 20 from, and in alignment with, the applicator 73. An aperture 82 provided in the frame member 11 adjacent the support plate 80 permits an externally mounted member to be introduced into the cassette 10 to displace the support plate 80 into contact with the film strip 20 and to seat the film strip against the applicator 73 whereby the film strip is slidably engaged between the support plate and the applicator.

Referring once again to FIG. 1 of the drawings, it will be seen that a resilient member 86 is connected to the inside face of the wall 40 by any suitable means, such as rivets 87, and extends over and in spaced relationship to the end surfaces 88 and 90 of idlers 28 and 30, respectively. Provided in the wall 40 is an aperture 92 disposed over the resilient member 86 whereby an external force applying member may be introduced into the cassette 10 to urge its end portions 94 and 96 into frictional engagement with the idlers 28 and 30, respectively, to restrain further rotational movement of those idlers. In order to effectively light seal the interior of the cassette 10, a ring 98 mounted on the resilient member 86 is coaxially disposed with respect to the aperture 92 and adapted to seat in an annular recess 100 of the wall 40.

The reels 16 and 18 are respectively provided with fluted recesses 102 and 104 which are adapted to receive externally mounted drive means through apertures (not shown) appropriately provided through the wall 40. Thus the cassette 10 includes means for reversibly transporting the film strip 20 between the supply reel 16 and the takeup reel 18 and across the applicator 73 and the film gate 32.

Figure 4:
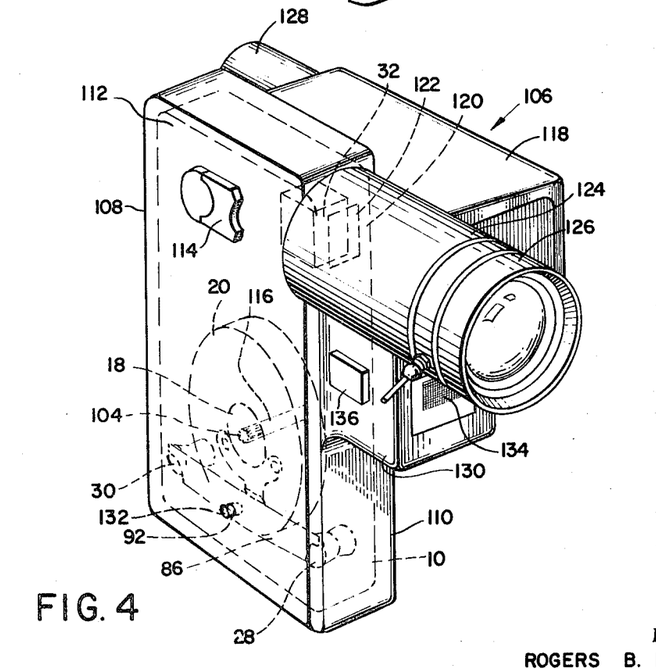
FIG. 4 is a perspective view illustrating a compact camera in which the film handling cassette shown in FIG. 1 is mounted and which embodies features of this invention.

Referring now to FIG. 4 of the drawings, a motion picture camera 106 will be seen which is uniquely compact in configuration and attractive in design. The main section of this camera 106 comprises a film handling cassette receiving chamber 108 and it will be noted that the lower portion 110 thereof is adapted to serve as a handle by which the operator may grip the camera. The operator can latch and unlatch a hinged door 112 comprising one side of the chamber 108 by manipulation of a lever 114 to facilitate the mounting of the cassette 10 in the camera 106.

It is most important to note that the camera's chamber 108 is only slightly larger than the film handling cassette 10. For instance, the outside dimensions of a cassette 10 accommodating 50 feet of photographic film strip 20 are 4.9 inches in length, 2.75 inches in width and 0.64 inches in depth. This particular cassette 10 may be mounted in a camera 106 having a cassette receiving chamber 108, the outside dimensions of which chamber are 5.15 inches in length, 3.0 inches in width and 0.85 inches in depth.

When the cassette 10 is mounted into the camera's chamber 108, a drive shaft 116 of the camera 106 seats in the fluted recess 104 of the cassette's takeup reel 18. This drive shaft 116 in turn is connected to the camera's motor (not shown) through a friction clutch (not shown), which motor and its associated battery (not shown) are carried in a section 118 adjacent the camera's cassette receiving chamber 108.

The front face 120 of the camera's chamber 108 is provided with a picture framing aperture 122 positioned to be in alignment with the cassette's film gate 32 when the cassette 10 is mounted in the camera 106. Conventional shutter means (not shown) are contained in a tubular member 124 extending from the front face 120 of the camera's chamber 108 in registry with the picture framing aperture 122 and a zooming and focusing lens system 126 is mounted at one end of this tubular member. The camera 106 is also provided with an eyepiece 128 which conventionally, in conjunction with the lens system 126, facilitates through the lens viewing of the scene being photographed.

A conventional camera claw mechanism (not shown) is housed in another portion 130 of the camera 106, which portion extends below the section 118 and in front of the chamber 108. In this respect, if desirable, the cassette 10 may include still an additional aperture and conventional means (not shown) for receiving the camera's claw mechanism and cooperating therewith so that the claw mechanism may at the proper time advance the film strip 20 across the film gate 32 and the framing aperture 122 in intermittent steps. In the embodiment illustrated, the photosensitive surface of the film strip 20 faces inwardly of the cassette such that exposure of the emulsion is effected through the transparent film base.

Extending from the inside face of the camera's door 112 is a pin 132 positioned to be in alignment with the cassette's aperture 92 so that, after the cassette 10 has been mounted in the chamber 108, closing of the door 112 will automatically introduce the pin 132 into the cassette and against the cassette's resilient member 86 to effect a snubbing of the idlers 28 and 30. If desired, one or both of the idlers 26 and 28 may be spring biased toward the corners which they occupy of the cassette 10 and capable of being moved resiliently inward away from those corners. Such an arrangement represents one way to minimize strain exerted on the film strip 20 by the conventional intermittent film advancement mechanism of the camera which engages the sprocket holes 60 of the film strip during exposure operations.

A photosensitive element 134 is mounted in the front face of the portion 130 of the camera 106 and is connected in a conventional manner with the lens system 126 to provide the camera with an automatic exposure control capability. Also, a stop-start button 136 controlling the operation of the camera's motor is conveniently positioned on this portion 130 of the camera 106. It will be recognized that this stop-start button 136 is readily accessible to one of the photographer's fingers of the hand by which he grips the lower portion 110 of the camera's chamber 108.

Figure 5:
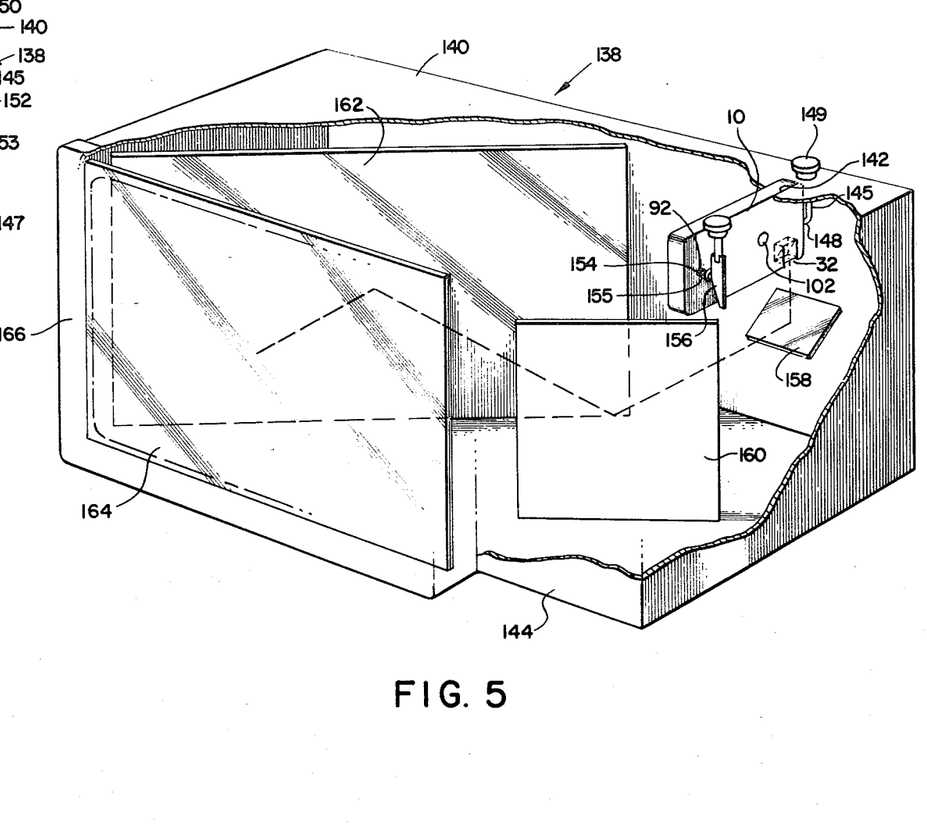
FIG. 5 is a diagrammatic cutaway perspective view of a processor-projector unit adapted to receive the film handling cassette shown in FIG. 1.

After the film strip 20 has been completely exposed with the cassette 10 mounted in the camera 106, the cassette may be removed from the camera and inserted into a processor projector unit 138 diagrammatically illustrated in FIG. 5 of the drawings. In this connection, the top panel 140 of the processor-projector unit 138 is provided with a slot 142 configured to receive the cassette 10. Prior to inserting the cassette 10 into the processor-projector unit 138, its plate 14 should be removed to expose the rupturable processing fluid containing pod 62 and the fluid feeding device 66 connected thereto. The processor-projector unit 138 includes means (not shown) for rupturing the pod 62 and forcing the processing fluid initially contained therein through the fluid feeding device 66 into the reservoir chamber 70 of the dispensing container 72. For instance, these means may take the form of a roller, as described in aforementioned copending application Ser. No. (Case No. 3855 ) displaceably mounted in the plane of the pod 62 and feeding device 66 so that, after the cassette 10 has been inserted into the slot 142 of the processor-projector unit 138, the roller may be drawn across the pod and then the feeding device to progressively apply a compressive force therealong towards the exit orifice 68. Also, after the cassette 10 has been fully inserted into the unit 138, drive shafts (not shown) of that unit engage the fluted recesses 102 and 104 of the supply reel 16 and the takeup reel 18, respectively. These shafts are connected in a conventional manner to a motor (not shown) in order to facilitate selective reversible transport of the film strip 20 between the supply reel 16 and the takeup reel 18. As is conventional, the drive shaft which engages the takeup reel 18 is connected to the motor through a friction clutching arrangement. Appropriate switches (not shown) for selectively energizing the cassette's supply reel 16 and takeup reel 18 are conveniently located on a control panel 144 of the processor-projector unit 138.

Figure 3:
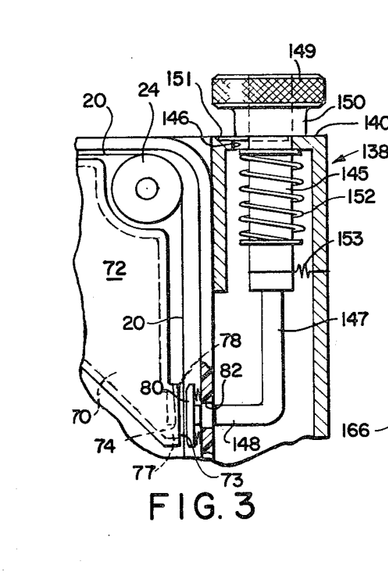
FIG. 3 is a partial vertical sectional view illustrating the cooperating elements of the cassette and a processor-projector unit for selectively seating the film strip against the applicator.

As is shown in FIG. 3 of the drawings, a pin 145 extends through a slot 146 provided in the top panel 140 of the unit 138 and its lower portion 147 terminates in a projection 148 aligned with the aperture 82 of the cassette 10 once the cassette has been inserted into the processor-projector unit 138. Mounted on the end of the pin 145 extending exteriorly of the unit 138 is a hand knob 149 provided with a reduced stem portion 150 adapted to seat in a recess 151 communicating with the slot 146. A spring 152 continually urges the pin 145 and hand knob 149 assembly inwardly of the processor-projector unit 138, while a spring 153 continually urges that assembly along the slot 146 in a right hand direction as viewed in FIG. 3. Consequently, after the cassette 10 has been inserted into the processor projector unit 138, the operator may displace the hand knob 149 along the slot 146 to bring the support plate 80 into contact with the film strip 20 and to slidably engage the film strip against the applicator 73. At that time, the reduced stem portion 150 of the hand knob 149 seats in the recess 151 to lock the support plate 80 against the film strip 20. In this respect, the aperture 82 is slightly larger than the projection 148 to allow for a little downward displacement of the projection as the reduced stem portion 150 seats in the recess 151.

A pin 154 (see FIG. 5) of the processor-projector unit 138 is positioned to be in alignment with the cassette's aperture 92 once the cassette has been fully inserted into the processor-projector unit. A spring 155 mounted on the pin 154 urges that pin in a direction away from the cassette 10. However, a tapered arm 156 slidably mounted within the processor-projector unit 138 and extending through that unit's top panel 140 contacts the pin 154 to restrain its movement away from the cassette 10. In this manner, the operator may manipulate the arm 156 to selectively drive the pin 154 internally of the cassette 10 against the resilient member 86 to effect a snubbing of the idlers 28 and 30.

The processor-projector unit 138 also includes other conventional elements, e.g., an intermittent film advancing mechanism, a light source, a shutter mechanism and a lens system. The light source 157 of the processor-projector unit 138 is diagrammatically illustrated in FIG. 2 and is positioned such that its light rays are directed through the concave light receiving transparent face 50 of the light reflecting element 48 when the cassette 10 is mounted in the processor-projector unit. Operation of this light source 157 is controlled by a button (not shown) positioned on the control panel 144. Light rays from the light source 157 are redirected by the cassette's light reflecting element 48 outwardly thereof through the developed film strip 20 and the film gate 32. These now image carrying light rays are then further redirected by a plurality of mirrors 158, 160 and 162 focused by the projector lens system onto a viewing screen 164 mounted in the front panel 166 of the processor-projector unit 138.

The unique configuration of the cassette 10 permits this processor-projector unit 138 to be significantly more compact than would otherwise be possible. More specifically, the size of the screen 164, i.e., the size of the picture displayed for viewing purposes, is determinative of the length of the optical path between the film strip 20 disposed across the cassette's film gate 32 and the screen 164. In this particular arrangement, utilizing the standard super 8 film format and a screen 10 inches in height and 13.33 inches in width and a projection lens having a focal length of 0.39 inches, the center of the film gate 32 must be positioned 8.5 inches behind the rear face of the screen. As previously indicated, the cassette 10 is 4.9 inches in length and consequently, with the film gate 32 located adjacent its far corner as viewed in FIG. 5, the far end of the cassette is 9.3 inches from the rear of the screen 164 under the conditions stated. This permits the processor-projector unit 138 to have an overall depth of only 9.75 inches. If the cassette's film gate 32 were located, for instance, centrally between the idlers 26 and 28, the processor-projector unit 138 would necessarily have to be 1.95 inches greater in depth.

OPERATION OF THE PREFERRED EMBODIMENT

To briefly summarize the operation of the illustrated preferred embodiment of this invention, the cassette 10 is initially furnished with substantially the entire length of its photographic film strip 20 in an unexposed photosensitive condition coiled around the supply reel 16. At this time, the resilient member 86 is disposed out of contact with the idlers 28 and 30 with its ring 98 seated in the annular recess 100. Additionally, that section of the film strip 20 disposed between the applicator 73 and the support plate 80 is positioned in spaced relationship to those elements. As furnished, the cassette 10 is adapted to be quickly mounted into the cassette receiving chamber 108 of the compact camera 106. The operator may hold the camera 106 by gripping the lower portion 110 of the chamber 108 and position the eyepiece 128 adjacent his eye in order to view the scene being photographed. With the camera's door 112 closed, the pin 132 automatically effects a snubbing of the idlers 28 and 30 and the photosensitive film strip 20 may be selectively exposed to light rays emitting from the scene to be photographed by operation of the stop-start button 136. When the door 112 of the camera 106 is once again open, the resilient member 86 of the cassette 10 will automatically return to its original position out of contact with the idlers 28 and 30.

After the picture taking sequence has been completed, the cassette 10 may be quickly removed from the camera 106 and, when desired, its plate 78 removed to expose its rupturable pod 62 and quickly inserted into the processor-projector unit 138. The operator should then slide the hand knob 149 along the slot 146 of the processor-projector unit 138 to seat its reduced stem portion 150 in the recess 151 to slidably engage the film strip 20 between the applicator 73 and the support plate 80. As indicated, cooperating means of the processor-projector unit 138, are then displaced to progressively engage the rupturable pod 62 and the fluid feeding device 66 to rupture the pod and to expel the processing fluid initially contained therein into the reservoir chamber 70 of the dispensing container 72.

By then turning an appropriate switch located on the control panel 144 of the processor-projector unit 138, the exposed strip of material 20 is returned from the takeup reel 18 to the supply reel 16. During this sequence, the photographic film strip 20 passes across the face of the applicator 73 and draws processing fluid therefrom to form a fluid coating along its entire length. In this respect it will be noted that with the cassette 10 inserted in the unit 138, the applicator 73 is disposed at the lowermost point of the dispensing container 72 and the force of gravity causes the processing fluid to be continually fed to the applicator from the reservoir chamber 70.

The motor of the processor-projector unit 138 is automatically deenergized by conventional means (not shown) as soon as the entire length of exposed film strip 20 has been drawn across the applicator 73 onto the supply reel 16. At this time the support plate 80 should be returned to its original position to permit the film strip 20 to return to a position out of contact with the applicator 73. This is accomplished by withdrawing the hand knob 149 from the recess 151 and allowing the spring 153 to return the pin 145 to its original position along the slot 146. Additionally, the operator should displace the tapered arm 156 inwardly of the processor-projector unit 138 to effect a snubbing of the idlers 28 and 30.

By then turning a second switch (not shown) mounted on the control panel 144, the light source 157 of the processor-projector unit 138 is energized and, simultaneously, the motor of that unit is also energized to drive the intermittent film advancement mechanism thereof and the takeup reel 18 of the cassette 10. As the now fully processed film strip 20 is once again transported across the film gate 32 onto the takeup reel 18, visible images contained thereon are projected onto the screen 164 for viewing purposes.

Preferably, the film strip 20 is returned from the takeup reel 18 to the supply reel 16 before removing the cassette 10 from the processor-projector unit 138. Once the cassette 10 has been removed from that unit 138, its plate 14 may be replaced thereon. In this condition the cassette 10 may be conveniently stored until it is again desired to view the developed film strip contained therein.

Those familiar with the motion picture arts will readily appreciate the novel and highly unique advantages of this invention. An extremely compact motion picture film handling cassette is provided in which a multiplicity of functions may be preformed. The exposure and projection station of the cassette is uniquely configured to render the cassette adaptable for alternate mounting in unusually compact camera and processor-projector units. Thus, the commercial success of motion picture systems of this general type is greatly enhanced. Additionally, the film handling cassette of the present invention includes an extremely inexpensive and efficient system for selectively snubbing idlers of the cassette. Further, the compact camera of this invention includes a simple means for automatically engaging the snubbing mechanism of the cassette.

This invention may be practiced or embodied in still other ways without departing from the spirit or essential character thereof. For instance, in some applications certain idlers included in the illustrated preferred embodiment of the invention may be eliminated. In this respect, under certain conditions it is possible to eliminate idler 30, in which case the configuration of the resilient member 86 may be simplified and the film strip will pass directly from the idler 28 onto the takeup reel 18. The preferred embodiment described herein is therefore illustrative and not restrictive, the scope of the invention being indicated by the appended claims and all variations which come within the meaning of the claims are intended to be embraced therein.

I claim:

1. A multipurpose film handling cassette adapted to be mounted in a camera for progressively exposing sections of a strip of photographic material to rays of image carrying light whereby a series of images may be recorded on said material and adapted to be subsequently mounted in a processor-projector unit wherein said exposed strip of material may be first treated to form visible images thereon from said recorded images and said visible images may be thereafter projected for viewing purposes, comprising:

an enclosed opaque housing including a pair of parallel opposed walls;

a supply reel mounted within said housing for rotation about an axis perpendicular to said walls and adapted to be driven by externally mounted drive means;

a takeup reel mounted within said housing for rotation about an axis spaced from and parallel to said axis of said supply reel, said takeup reel adapted to be driven by externally mounted drive means;

a first idler positioned in one extremity of said housing on the opposite side of said supply reel from said takeup reel for rotation about an axis parallel to said axes of said reels;

a second idler positioned in the extremity of said housing on the opposite side of said takeup reel from said supply reel and on the same side of said reels as said first idler for rotation about an axis parallel to said axes of said reels;

a third idler positioned in the extremity of said housing on the opposite side of said supply reel from said takeup reel and on the opposite side of said reels from said first and said second idlers for rotation about an axis parallel to said axes of said reels;

a fourth idler positioned in the extremity of said housing on the opposite side of said takeup reel from said supply reel and on the opposite side of said reels from said first and second idlers for rotation about an axis parallel to the axes of rotation of said reels;

a fifth idler disposed on the opposite side of said reels from said first and second idlers and intermediate of said third and fourth idlers for rotation about an axis parallel to said axes of said reels for rotation about an axis parallel to the axes of rotation of said reels;

strip of unexposed photographic material initially substantially entirely coiled on said supply reel with one end thereof attached thereto and sequentially passing around said fifth, third, first, second and fourth idlers and connected to said takeup reel, whereby said strip of material can be advanced from said supply reel to said takeup reel and returned to said supply reel;

a film gate intermediate of said first and second idlers and located in the immediate vicinity of said first idler adjacent said extremity of said housing occupied by said first idler whereby said strip of material progressively passes in operative relationship to said film gate as said strip of material is advanced from said supply reel to said takeup reel;

a normally inoperative film processing station mounted within said housing and adapted to operatively engage said strip of material between said first and said third idlers as said strip of material is returned from said takeup reel to said supply reel; and a resilient member extending from the inside face of one of said opposed walls in spaced relationship to end surfaces of said second and fourth idlers, said housing having means to receive an externally mounted force applying member into contact with said resilient member whereby said resilient member can be selectively displaced into contact with said second and fourth idlers to restrain rotational movement thereof as said strip of material is advanced from said supply reel to said takeup reel and removed from contact with said second and fourth idlers when said strip of material is returned from said takeup reel to said supply reel.

2. A motion picture film handling system comprising:
a cassette including:
an enclosed relatively flat substantially rectangular parallelepiped housing;
a strip of unexposed photographic material initially coiled within a first station of said housing;
means for progressively advancing said strip of material to, and coiling said strip of material within, a second station of said housing, the coiling axis of which is spaced from the coiling axis of said first station;
means located adjacent opposite extremities of one of the longest sides of said housing for guiding said strip of material along said one longest side of said housing as said strip of material is progressively advanced from said first station to said second station including means for changing the direction of said strip of material immediately adjacent each extremity of said side;
a film gate in operative relationship to incremental sections of said strip of material as said strip of material is advanced within said housing and positioned along said side of said housing in the immediate vicinity of one of said direction changing means adjacent the extremity of said side of said housing with which said one direction changing means is associated; and
a compact motion picture camera including:
a section adapted to receive said cassette and only sufficiently larger than said cassette to accommodate said cassette and having a picture framing aperture located to be in alignment with said film gate when said cassette is mounted therein;
means for selectively driving said advancing means of said cassette when said cassette is mounted in said section; and
a lens system for focusing image carrying light rays through said picture framing aperture onto the section of said strip of material disposed in operative relationship to said film gate, a substantial portion of said cassette receiving section extending below said lens system, when said camera is oriented in its normal position for exposure operations, and adapted to be held by an operator to facilitate said exposure operations.

3. A compact motion picture camera for use with a film handling cassette from which the film is not removed during exposure operations, such cassette being substantially flat and substantially greater in length than in width and including an exposure station disposed along its length adjacent an extremity thereof so that a substantially greater portion of such cassette extends on one side of such exposure station than on the opposite side thereof, a strip of unexposed photographic material coiled therein and means adapted to be driven by externally mounted drive means for progressively advancing such strip of material within such cassette from its initial coiled position past such exposure station in operative relationship thereto, comprising:
a section adapted to receive such cassette and only sufficiently larger than such cassette to accommodate such cassette and having a picture framing aperture located to be in alignment with such exposure station when such cassette is mounted therein;
an additional section adjacent the end of said cassette receiving section in which said picture framing aperture is located adapted to carry a motor and associated battery;
means for selectively driving such advancing means of such cassette when such cassette is mounted in said section; and a lens system for focusing image carrying light rays through said picture framing aperture into such exposure station onto the section of such strip of material in operative relationship to such exposure station, said lens system projecting from said cassette receiving section in alignment with said picture framing aperture with the major portion of said cassette receiving section extending below said projecting lens system and said additional section, when said camera is oriented in its normal position for said exposure operations, so that a substantial portion of said cassette receiving section is accessible to serve as a handle to be gripped by an operator to facilitate said exposure operations.

4. The compact camera of claim 3 additionally comprising another section extending from such cassette receiving section below said picture framing aperture and means for controlling the operation of said drive means mounted in said other section and accessible to be operated by one finger of the hand with which such operator holds said portion of said substantial cassette receiving section.

5. A compact camera for use with a film handling cassette from which the film is not removed during exposure operations, said cassette including an exposure station, a strip of unexposed photographic material coiled therein, means adapted to be driven by externally mounted drive means for progressively advancing such strip of material from its initial coiled position past such exposure station in operative relationship thereto, at least one idler around which such strip of material is disposed after passing such exposure station, a resilient member spaced for such idler and adapted to be displaced into contact with such idler by an externally mounted force applying member to restrain rotational movement thereof and having means to receive an externally mounted force applying member into operable relationship to such resilient member, comprising:
a section adapted to receive such cassette including a door through which such cassette may be introduced thereinto and having a picture framing aperture located to be in alignment with such exposure station when such cassette is positioned in said section;
a lens system for focusing image carrying light rays through said picture framing aperture into such exposure station onto the section of such strip of material disposed in operative relationship to such exposure station;
means for selectively driving such advancing means of such cassette; and
a force applying member extending from the inside face of said door positioned to automatically enter such cassette through such force applying member receiving means thereof to displace such resilient member into contact with such idler when said door is closed.

6. A compact motion picture camera for use with a film handling cassette from which the film is not removed during exposure operations, such cassette being substantially flat and substantially greater in length than in width and including an exposure station disposed along its length adjacent an extremity thereof, a strip of unexposed photographic material coiled therein, means adapted to be driven by externally mounted drive means for progressively advancing such strip of material within such cassette from its initial coiled position past such exposure station in operative relationship thereto, at least one idler around which such strip of material is progressively disposed after passing such exposure station, a resilient member spaced from such idler and adapted to be displaced into contact therewith and means to receive a force applying member into contact with such resilient member whereby such resilient member may be displaced into contact with such idler to restrain rotation thereof, comprising:
a section adapted to receive such cassette and only sufficiently larger than such cassette to accommodate such cassette and having a picture framing aperture located to be in alignment with such exposure station when such cassette is mounted therein, said section including a door through which such cassette may be introduced thereinto;

means for selectively driving such advancing means of such cassette when such cassette is mounted in said section;

a lens system for focusing image carrying light rays through said picture framing aperture into such exposure station onto the section of such strip of material in operative relationship to such exposure station, a substantial portion of said section extending below said lens system, when said camera is oriented in its normal position for said exposure operations, and adapted to be held by an operator to facilitate said exposure operation; and a force applying member extending from the inside face of said door positioned to automatically enter such cassette through such force applying member receiving means thereof to displace such resilient member into contact with such idler when such cassette is mounted in said cassette receiving section and said door is closed.

7. A cassette for handling a strip of photographic material comprising:

an unexposed strip of photographic material initially coiled within a first station of said cassette;

means for progressively advancing said strip of material to, and coiling said strip of material within, a second station of said cassette, the coiling axis of which is spaced from the coiling axis of said first station and for returning said strip of material to said first station;

means for guiding said strip of material along a linear path as said strip of material is progressively advanced from said first station to said second station including means for changing the direction of said strip of material immediately adjacent each extremity of said linear path, said linear path being greater in length than the distance between the coiling axes of said first and second stations;

a film gate in operative relationship to incremental sections of said strip of material as said strip of material is advanced along said linear path and positioned in the immediate vicinity of one of said direction changing means adjacent the extremity of said linear path with which said one of said direction changing means is associated; and a normally inoperative film processing station adapted to operably engage said strip of material as it is returned from said second station to said first station.

8. A cassette comprising:

an opaque housing including at least one sidewall having extremities spaced a substantial distance apart;

an unexposed strip of photographic material initially uncoiled within a first station of said housing;

first means for progressively advancing said strip of material to, and coiling said strip of material within, a second station of said housing, the coiling axis of which is spaced from the coiling axis of said first station and for returning said strip of material to said first station;

second means for guiding said strip of material along said sidewall of said housing as said strip of material is progressively advanced from said first station to said second station including third means for changing the direction of said strip of material immediately adjacent one said extremity of said sidewall;

a film gate in the immediate vicinity of said third means adjacent said one extremity of said sidewall and spaced a substantial distance from the other said extremity of said sidewall and in operative relationship to incremental sections of said strip of material as said strip of material is advanced within said housing from said first station to said second station; and A normally inoperative film processing station mounted within said housing and adapted to operably engage said strip of material as it is returned to said first station.

9. A compact camera for use with a film handling cassette from which the film is not removed during exposure operations, said cassette including an exposure station, a strip of unexposed photographic material coiled therein, means adapted to be driven by externally mounted drive means for progressively advancing such strip of material from its initial coiled position past such exposure station in operative relationship thereto, at least one idler around which such strip of material is disposed after passing such exposure station, means for selectively restraining the rotation of said idler responsive to said rotation restraining means being engaged by an externally mounted member, comprising:

a section adapted to receive such cassette including a door through which such cassette may be introduced thereinto and having a picture framing aperture located to be in alignment with such exposure station when such cassette is positioned in said section;

a lens system for focusing image carrying light rays through said picture framing aperture into such exposure station onto the section of such strip of material disposed in operative relationship to such exposure station;

means for selectively driving such advancing means of such cassette; and a member adapted to engage such rotation restraining means of such cassette to preclude rotation of said idler during exposure operations.

10. The camera of claim 9 wherein said member extends from the inside face of said door positioned to automatically engage such rotation restraining means of such cassette when such cassette is mounted in said section of said camera and said door is closed.

11. A multipurpose motion picture film handling cassette adapted to be mounted in a camera for progressively exposing sections of a strip of photographic material to rays of image carrying light whereby a series of images may be recorded on said material and adapted to be subsequently mounted in a projector or viewer whereby, after said material has been treated to form visible images thereon from said recorded images, said visible images may be projected or viewed, comprising:

an enclosed opaque housing including a pair of parallel opposed walls;

a supply reel mounted within said housing for rotation about an axis perpendicular to said opposed walls and adapted to be driven by externally mounted drive means;

a takeup reel mounted within said housing for rotation about an axis spaced from and parallel to said axis of said supply reel, said takeup reel adapted to be driven by externally mounted drive means;

a first idler positioned in one extremity of said housing on the opposite side of said supply reel from said takeup reel for rotation about an axis parallel to said axes of said reels;

a second idler positioned in the extremity of said housing on the opposite side of said takeup reel from said supply reel and on the same side of said reels as said first idler;

a strip of unexposed photographic material initially substantially entirely coiled on said supply reel with one end thereof attached thereto and having a leader sequentially passing around said first and said second idlers and connected to said takeup reel, whereby said strip of material can be advanced from said supply reel to said takeup reel and returned to said supply reel;

a film gate intermediate of said first and second idlers for access of image carrying light rays into said housing and located in the immediate vicinity of said first idler adjacent said extremity of said housing occupied by said first idler whereby said photographic strip of material progressively passes in operative relationship to said film gate as said strip of material is advanced from said supply reel to said takeup reel;

a third idler positioned to engage said strip of material intermediate of said supply reel and said first idler; and a normally inoperative film processing station mounted within said housing and adapted to operatively engage said strip of material intermediate of said first and said third idlers, whereby after exposure of said strip of photographic material said processing station may be rendered operable to effect the processing thereof.

UNITED STATES PATENT OFFICE
CERTIFICATE OF CORRECTION

Patent No. 3,600,071      Dated August 17, 1971

Inventor(s) Rogers B. Downey

It is certified that error appears in the above-identified patent and that said Letters Patent are hereby corrected as shown below:

IN THE SPECIFICATION:

Column 1, line 8, "am" should be --an--;
Column 1, line 75, "unit" should be --unit(s)--;
Column 4, line 32, delete "Pat." and in lieu thereof insert --patents of Edwin H. Land" and delete "To Edwin H. Land";
Column 5, line 53, delete "of" (first occurrence):

Column 7, line 67, insert a hyphen after "processor";
Column 8, line 27, after "162" insert --and--;
Column 8, line 37, "super" should be --Super--;
Column 8, line 73, "open" should be --opened--;
Column 9, line 59, "preformed" should be --performed--;
Column 9, line 67, after "includes" delete "a";

IN THE CLAIMS:

Column 10, line 52, before "strip" insert --a--;
Column 12, line 16, "such" should be --said--;
Column 12, line 19, after "said" (first occurrence) insert --substantial-- and after "said" (second occurrence) delete "substantial";
Column 12, line 23, "said" should be --such--;
Column 12, line 31, "for" should be --from--;
Column 13, line 46, after "initially" delete "un-";
Column 13, line 66, "A" should be --a--;
Column 13, line 71, "said" should be --such--;
Column 14, line 4, "said" should be --such--;
Column 14, line 5, "said" should be --such--;

Signed and sealed this 18th day of July 1972.

(SEAL)
Attest:

EDWARD M. FLETCHER, JR.
Attesting Officer

ROBERT GOTTSCHALK
Commissioner of Patents